UNITED STATES PATENT OFFICE.

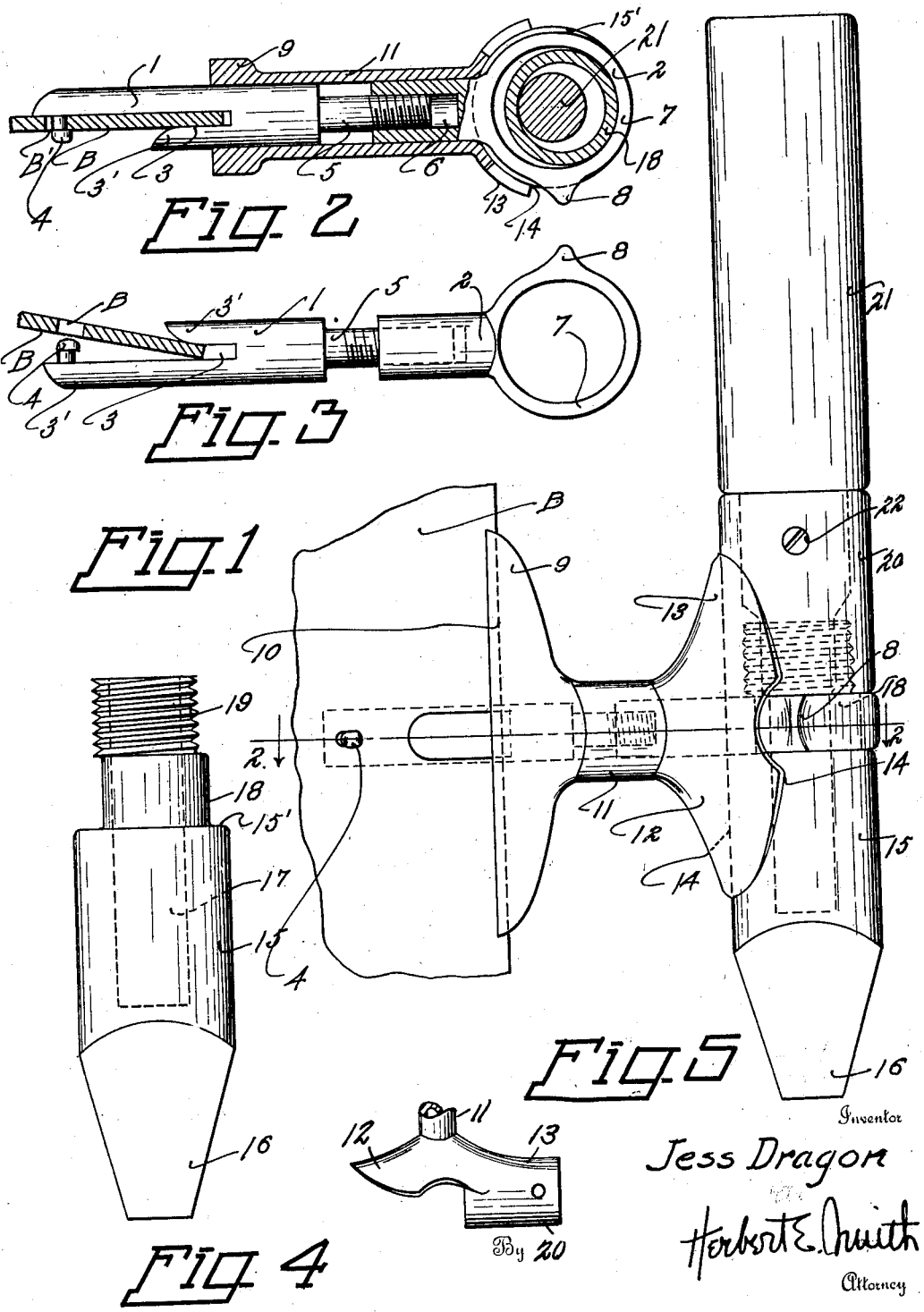

JESS DRAGON, OF ENAVILLE, IDAHO, ASSIGNOR OF ONE-HALF TO WILLIAM A. BORO, OF ENAVILLE, IDAHO.

SAW-HANDLE.

1,385,671.  Specification of Letters Patent.  Patented July 26, 1921.

Application filed January 18, 1921. Serial No. 438,102.

*To all whom it may concern:*

Be it known that I, JESS DRAGON, a citizen of the United States, residing at Enaville, in the county of Shoshone and State of Idaho, have invented certain new and useful Improvements in Saw-Handles, of which the following is a specification.

The present invention relates to improvements in saw handles especially adapted for cross cut saws of the type manipulated by two men, grasping a handle at each end of the saw for use in felling and cutting into lengths, trees.

The invention relates particularly to improvements in that type of device in which a spindle shaped handle is secured to the saw blade by a longitudinally extending bar or bolt, one end of which is secured to the blade of the saw and the other end of the draw bolt is secured to the handle or spindle, the bolt and spindle being located at right angles.

By the utilization of the invention forming the subject matter of this application for patent a facile adjustment of the blade to the handle is secured, the blade is perfectly held or attached to the handle, and the portion of the handle grasped by the hand is permitted to have a slight movement, or turning action on the handle-spindle, thus permitting a continuous grip on the handle and eliminating slipping of the hand that grasps the handle.

To this end the invention consists in certain novel combinations and arrangements of parts involving a specially formed handle portion, bracket, and draw bolt as the essential elements, combined with minor features as will be hereinafter more fully described and claimed.

In the accompanying drawings one complete example of the physical embodiment of the invention is illustrated according to the best mode so far devised for the combination and arrangement of parts in the practical application of the principles of the invention.

Figure 1 is a view in side elevation showing a portion of one end of a saw blade, with the handle of the invention applied thereto as in actual use.

Fig. 2 is a longitudinal, horizontal, sectional view on line 2—2 of Fig. 1.

Fig. 3 is a plan view of the draw bolt showing the application of the blade thereto.

Fig. 4 is a detail of the spindle of the handle.

Fig. 5 is a detail with the handle ferrule and bracket in one piece.

The saw blade B is of the usual cross cut saw type and provided with an orifice B' at each end for coupling with the handles, one of which is illustrated in the drawings.

In coupling the blade to the handle a draw bolt is employed which comprises the blade section 1 and the handle section 2, the former having an end kerf or groove 3 therein and a shortened jaw 3' to permit ready insertion into the kerf of the blade, and a headed pin 4 on the longer jaw of the bolt is passed through the orifice B' in usual manner for retaining the blade. The outer end of the section 1 terminates in a reduced, threaded extension 5, adapted to screw into the complementary socket 6 of the handle section of the draw bolt, and by means of this threaded connection the draw bolt may be extended or contracted in manner similar to a turn buckle for adjusting the bolt to various saw blades.

The handle section 2 of the draw bolt is provided with an enlarged, open, circular head 7, upon which an exterior lug 8 is fashioned, as a thumb piece for use in pushing the draw bolt toward the blade in order to free the latter from the headed pin 4 in the process of detaching the blade, and the head is for a purpose to be described.

Between the blade and the handle a bracket is employed and comprises a head 9 with a groove 10 in its outer face, to receive the edge of the saw blade, and the head is of sufficient length to receive and rigidly hold the blade in stabilized position. The tubular portion or sleeve 11 of the bracket, located at right angles to the head is adapted to receive and inclose the draw bolt which projects through the opening in the head 9 forming a continuation of the sleeve, and at the end of this sleeve, opposite the blade-head, a handle-head is formed integrally therewith. The handle-head of the bracket is designated as a whole by the numeral 12, and this head has an upper outer curved or semi-circular face 13 and a lower outer curved or semicircular bearing face 14 for co-action with the portion of the device forming the handle for the saw.

The handle portion of the saw includes a metallic spindle 15 having a cylindrical body and a squared end 16, the latter adapted to receive a wrench or other tool employed to "draw" the draw bolt for clamping the blade, as will be described. Preferably the spindle is hollow or formed with a socket 17 to provide for lightness of weight, and an essential feature of the spindle is the bearing sleeve 18 eccentric to the cylindrical body 15 of the spindle or offset from axial alinement therewith, and the spindle is fashioned with a threaded head 19 concentric with the body portion 15. It will be apparent that the eccentric bearing 18 of the spindle is adapted to be inserted and retained within the bearing ring or head 7 of the draw bolt, as in Figs. 1 and 2, and it should be noted that the body 15 of the spindle is adapted for close frictional contact with the curved face 14 of the handle-head of the bracket. The shoulder 15' of the body 15 rests against or receives the lower edge of the ring 7, and this close contact of parts, together with the close frictional contact between the body and curved face of the head 14 insures a rigid and braced connection of the spindle, bracket and draw bolt.

A metal ferrule 20 is threaded on the concentric head 19 of the spindle, and is secured to the wood handle 21 by a screw 22. Only a slight frictional contact is present between the ferrule 20 and the curved face 13 of the handle head of the bracket which permits the wood handle and ferrule to swing or turn in the hand which grasps the portion 21 as the saw is reciprocated, thus providing for facile and free manipulation of the saw as it is reciprocated.

In assembling the parts of the handle device the spindle head 19 is first passed through the eye or circular head of the draw bolt and the eccentric bearing 18 located in the head with the shoulder 15' against the edge of the open head, after which the ferrule is screwed home on the threaded head 19 with the projecting end of the wood handle in the socket of the spindle. The adjustable draw bolt is now manipulated to adapt it to the space between the saw blade and the handle, and the aperture of the blade is slipped over the retaining pin 4. In this position the eccentric bearing 18 is offset to the left of the axial center of the spindle (opposite to the position of Fig. 2) and the draw bolt in the bracket has been adjusted to approximately the space between the outer grooved face of the saw-head of the bracket which receives the edge of the saw blade, and the spindle which is in contact with the curved bearing face 14 of the handle-head of the bracket. A tool is now applied to the squared end 16 of the spindle and the latter is given a half turn, swinging the eccentric 18 to the right and drawing the draw bar into the sleeved bracket, of course bringing the saw blade with it. This action rigidly couples the spindle, draw bolt and bracket with the draw head 7 frictionally engaging the eccentric, the handle head of the bracket bracing the spindle, and the saw blade drawn tight in its grooved receiver or head 9 of the bracket. As before stated, the ferrule, which is threaded on the head 19, is of such exterior diameter as not to obstruct the "drawing" movement of the blade and bracket and therefore the frictional contact between the ferrule and the curved face 13 of the handle head of bracket will permit an oscillation of the ferrule and wood handle on the threaded head, to accommodate the hand grasp when the saw is reciprocated.

When dismantling is required, the spindle is given a half turn, by a tool, to release the eccentric connection, and then by thumb pressure on the lug 8 the draw bolt may be pushed through the bracket to permit disengagement of the perforated saw blade with the pin 4 and the blade may be detached as in Fig. 3.

In some cases it is desirable to have the handle rigid and in that case I intend to form the handle head 13 of the bracket integral with the ferrule 20 and secure the wooden handle therein by the screw 22.

Claims:—

1. The combination with a saw blade, a hollow bracket and a draw bolt therein to retain the blade and provided with an open head, of a spindle having an eccentric portion in the head, a wood handle in the spindle, and means for turning the spindle for the purpose described.

2. The combination with a saw blade, a hollow bracket and a sectional, adjustable draw bolt therein coupled with the blade and provided with an open head, of a hollow spindle having a squared end and an eccentric portion in said open head, a threaded extension on said eccentric portion, a wood handle in said spindle and a ferrule on the handle engaging said extension.

3. The combination with a saw blade, a hollow bracket having a grooved blade head, a draw bolt within the bracket coupled to the blade, a handle-head on the bracket, and an open head on the draw bolt, of a rotatable spindle having an eccentric portion in said open head and adapted to frictionally engage said handle head, a threaded extension on said eccentric portion, and a handle having a ferrule threaded on said extension, for the purpose described.

In testimony whereof I affix my signature.

JESS DRAGON.